Nov. 19, 1968  C. C. ROBINSON  3,411,840
RADIATION MODULATOR
Filed May 25, 1964  2 Sheets-Sheet 1
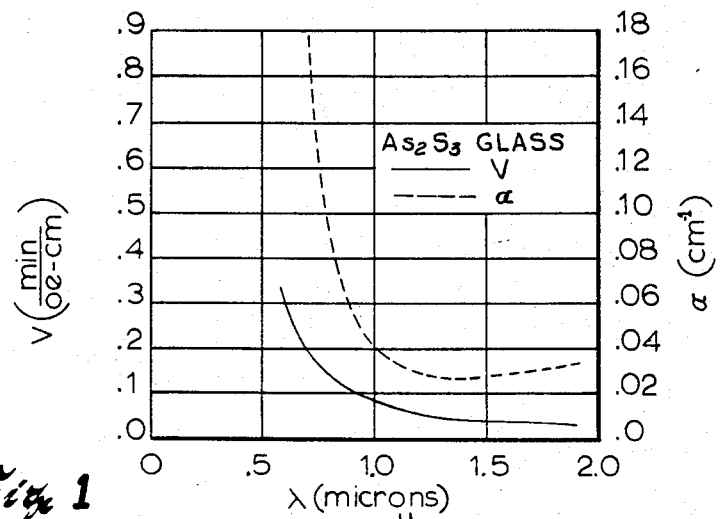
Fig. 1
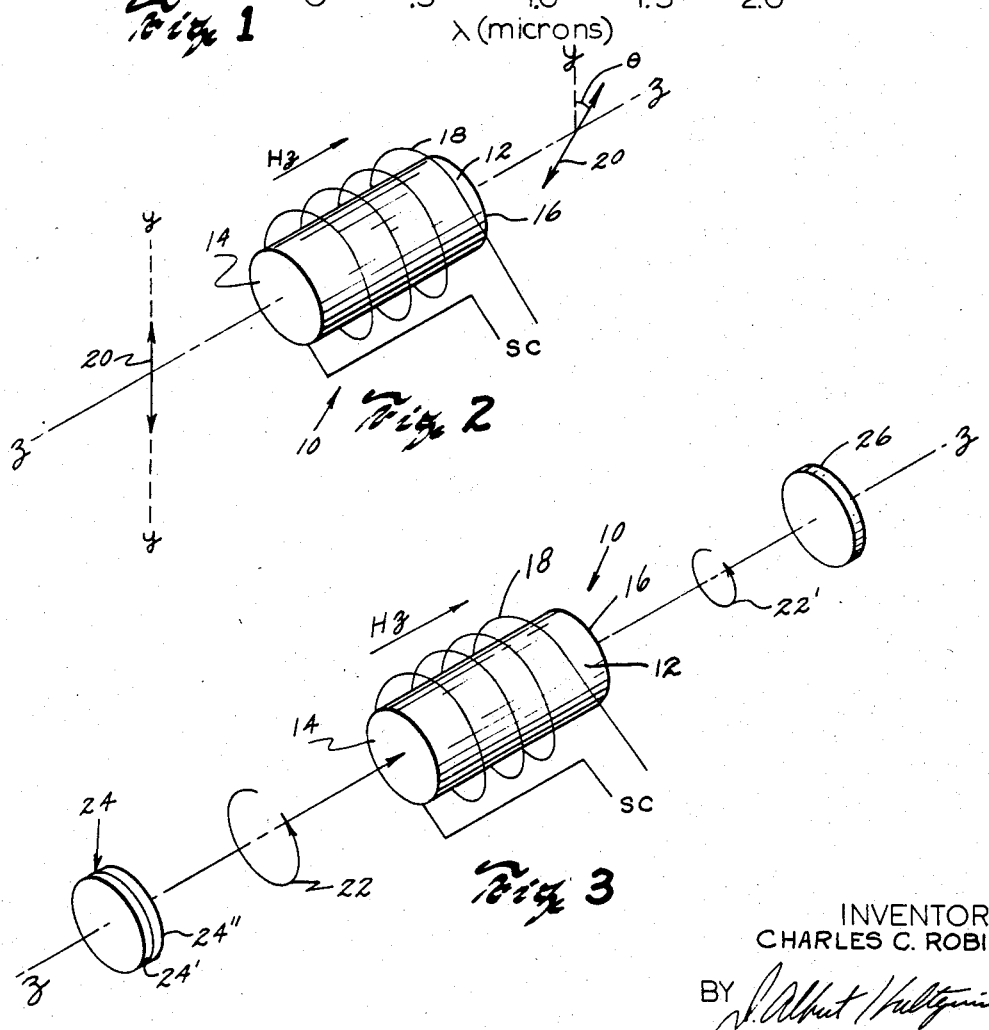
Fig. 2
Fig. 3
INVENTOR
CHARLES C. ROBINSON
BY
ATTORNEY

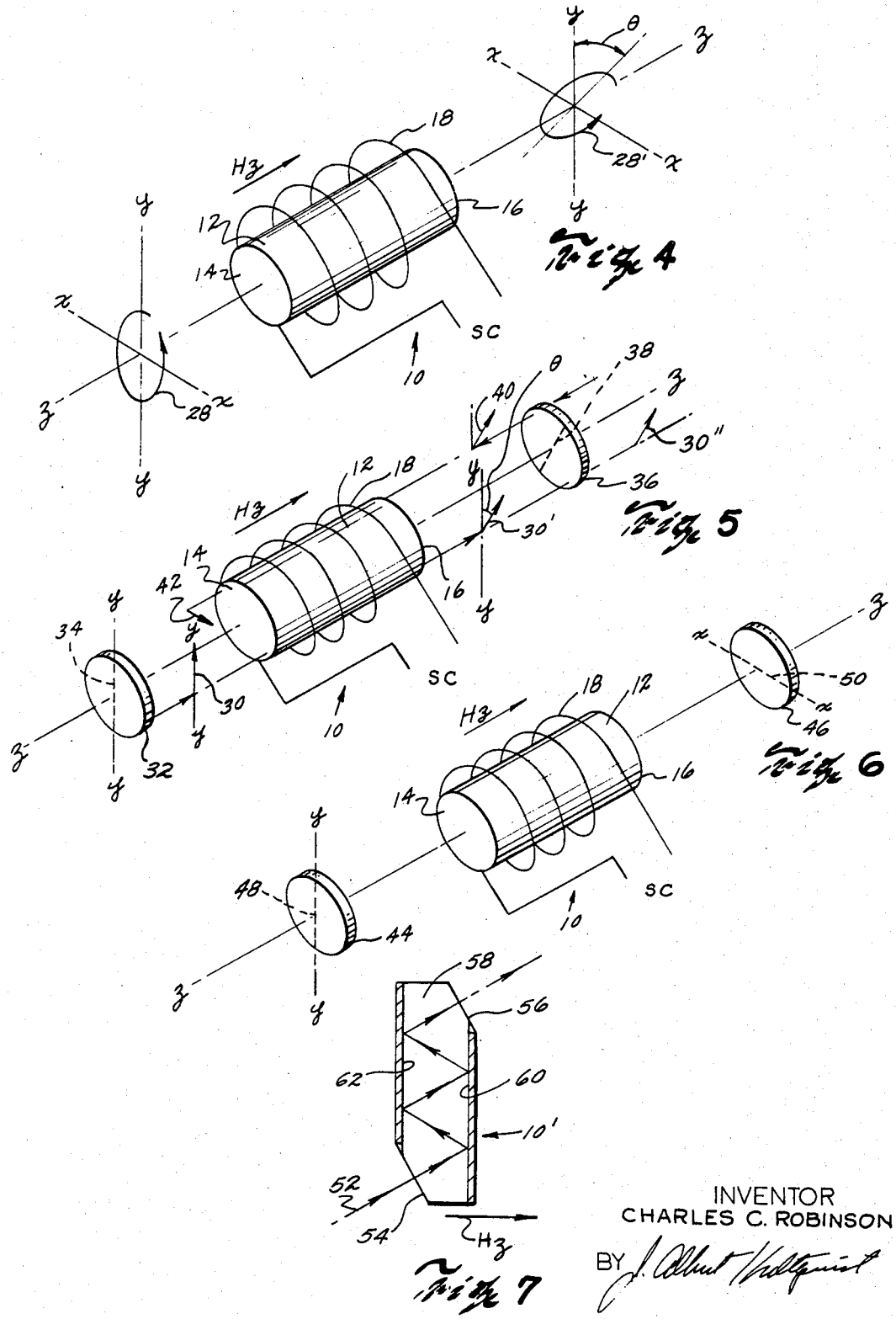

United States Patent Office 3,411,840
Patented Nov. 19, 1968

3,411,840
RADIATION MODULATOR
Charles C. Robinson, Southbridge, Mass., assignor, by mesne assignments, to American Optical Company, Southbridge, Mass., a corporation of Delaware
Filed May 25, 1964, Ser. No. 369,791
8 Claims. (Cl. 350—151)

ABSTRACT OF THE DISCLOSURE

The new use for glass consisting essentially of arsenic and an element of the sulphur group as a Faraday rotator having application to optical devices such as radiation phase shifters, isolators and shutters operating in the visible and infrared regions of the electromagnetic spectrum. The glass is placed in a magnetic field and polarized electromagnetic radiation is directed into the glass for effecting Faraday rotation thereof.

---

This invention relates to devices for modulating electromagnetic radiation and has particular relation to optical devices adapted to exhibit large Faraday rotation and possess high transparency for wavelengths of radiation in the visible and infra-red regions of the electromagnetic spectrum.

The Faraday effect in both magnetic and non-magnetic materials has been utilized in radiation modulating devices. However, magnetic materials such as ferromagnetic metals and ferrites capable of producing large Faraday rotation are generally of such low transparency that they must be prepared in very thin sections in order to transmit wavelengths in the infra-red and visible regions of the electromagnetic spectrum. Such sections are normally required to be so thin or short that despite relatively high coefficients of specific rotation, the amount of useful Faraday rotation obtainable is so small and difficult to utilize that such materials have very limited application as Faraday rotators in the visible and infra-red regions.

Magnetic crystalline and other materials which do have comparatively large coefficients of specific rotation and relatively high transparency in the visible region of the spectrum generally exhibit greatest rotation in the shorter wavelengths of the visible region and smaller values of specific rotation in the longer visible wavelengths and near infra-red. Also, being magnetically anisotropic, crystalline materials require, for optimum performance as Faraday rotators, that they be accurately shaped by cutting or grinding so that the path of a beam to be propagated therethrough has a predetermined orientation to a specific direction of easy magnetization. This presents problems of fabrication not encountered in the use of amorphous materials such as glasses.

On the other hand, ordinary oxide glasses which are relatively highly transmissive to radiation in the infra-red and visible regions of the spectrum have such small Verdet constants that immoderate lengths of the materials are required to show a usable magnitude of Faraday rotation.

The present invention contemplates the new use in optical Faraday rotating devices of special glasses composed of arsenic and an element of the sulphur group, which glasses I have found to exhibit an exceptionally large Faraday rotation per unit length and possesses a high transparency for radiation of wavelengths in the visible and infra-red regions of the electromagnetic spectrum; especially for wavelengths beyond approximately 0.6 micron and into the infra-red.

Accordingly, it is an object of this invention to provide for large Faraday rotation and high transparency in radiation rotating devices and more particularly to provide for exceptional rotation and transparency of radiation in the longer wavelengths of the visible and shorter wavelengths of the infra-red.

Another object is to provide a new use for glasses formed of arsenic and elements of the sulphur group and, as a corollary thereof, to provide improved Faraday rotators which are especially attractive for use in optical devices such as radiation phase shifters, isolators, rotators and shutters intended for operation in the visible and infra-red regions of the electromagnetic spectrum.

These objects and others which may become apparent hereinafter are achieved in the manner set forth in the following detailed description which is accompanied by a drawing in which:

FIG. 1 is a chart illustrating in curve form values of the Verdet constant and the absorbence or arsenic trisulfide glass;

FIG. 2 schematically illustrates the general arrangement of a Faraday rotator utilizing a glass composed of arsenic and an element of the sulphur group;

FIGS. 3, 4, 5 and 6 are schematic illustrations of various radiation modulating devices in which the arrangement of FIG. 2 is employed; and FIG. 7 illustrates a modification of the invention.

In accordance with principles of this invention, glasses formed of arsenic and an element of the sulphur group are utilized as Faraday rotators. Among the many varieties of such glasses, arsenic trisulfide has been found to exhibit a large coefficient of specific rotation together with high transparency to radiation in the longer wavelengths of the visible and into the infra-red regions of the spectrum. These characteristics make such glasses especially attractive for use in optical devices such as Faraday phase shifters, isolators, rotators and shutters.

Arsenic trisulfide glass, having a nominal composition of 60.9 percent arsenic and 39.1 percent sulphur, given by the chemical formula $As_2S_3$, has an index of refraction at a wavelength of 1.0 micron and in the absence of a magnetic field of approximately 2.472.

It can be seen from FIG. 1 which shows the value of Verdet constant V as a function of wavelength for arsenic trisulfide glass, that this glass exhibits a relatively large magnetic rotary power making it a highly desirable Faraday rotator especially for wavelengths of radiation between 0.6 microns and 1.9 microns. Also, from FIG. 1 which shows the approximate values of absorbence $\alpha$ of arsenic trisulfide glass it can be seen that it has a highly desirable low absorbency in the above mentioned 0.6 micron to 1.9 micron region of the spectrum.

The following tables compiled from actual measurements will further exemplify the large Faraday rotation and high transparency of arsenic trisulfide glass by making the comparison of such glass with a well-known heavy lead silicate glass commonly identified as Schott SFS–6 glass.

| Absorbence Constant ($\alpha$) | | Wavelength (microns) | Verdet Constant, $\left(\dfrac{\text{min.}}{\text{oersted-cm.}}\right)$ | |
|---|---|---|---|---|
| SFS–6 glass | $As_2S_3$ glass | | $As_2S_3$ glass | SFS–6 glass |
| .010 | 2.4 | 0.6 | .298 | .103 |
| .01 | .184 | 0.7 | .194 | .071 |
| .006 | .102 | 0.8 | .133 | .051 |
|  |  | 0.9 | .103 | .040 |
| .006 | .04 | 1.0 | .081 | .032 |
|  |  | 1.1 | .065 | .026 |
| .008 | .02 | 1.2 |  |  |
|  |  | 1.3 | .045 | .018 |
| .015 | .03 | 1.6 |  |  |
| .031 | .03 | 1.9 | .021 | .009 |

As it is apparent from FIG. 1 and the foregoing table, arsenic trisulfide glass having an absorption edge of around 0.6 micron exhibits a considerably greater magnetic rotary power than ordinary oxide glasses.

It should be understood, however that while the examples given above are based on the use of arsenic trisulfide ($As_2S_3$) glass, they are given for purposes of illustration only and other arsenic-sulphur group glasses are also useful. The absorption edge of arsenic-sulphur group glasses can be changed by varying the relative amounts of the two components (arsenic and the component of the sulphur group) during preparation of a particular glass. Thus, glasses having different Verdet and absorbence constants can be provided for optimum performance with radiation of preselected wavelengths other than those mentioned above.

As an illustration of more variations of arsenic sulfide glasses, one formed of 57.5 percent arsenic and 42.5 percent sulphur has, in the absence of a magnetic field, an index of refraction of approximately 2.42 for radiation of 1 micron in wavelength while a glass formed of 50 percent arsenic and 50 percent sulphur has an index of refraction of approximately 2.325 for 1 micron radiation in the absence of a magnetic field.

Arsenic-sulphur group glasses are diamagnetic and being such, Faraday rotation therein is essentially independent of temperature. The glasses respond much more quickly to reversals in magnetic fields applied thereto than do paramagnetic materials and, accordingly, have greater utility in high speed Faraday shutters.

In FIG. 2 there is shown, to illustrate principles of the invention, an arrangement of a Faraday rotator 10 using rod 12 formed of an arsenic-sulphur group glass which will be referred to hereinafter as being arsenic trisulfide. It should, however, be understood that rod 12 may be formed of other arsenic-sulphide, selenide or telluride glasses. Rod 12 may be of any cross-sectional configuration desired and is provided with opposite end faces 14 and 16 which are optically finished so as to be readily receptive and/or emissive to radiation directed thereonto.

To produce Faraday rotation of linearly or elliptically polarized radiation directed into rod 12 through one of its faces, it is inserted into coil 18 which may be energized to set up a magnetic field designated by arrow $H_z$. Direct, alternating or pulsating electric current sources SC may be used to energize coil 18, the selection of current being made according to the particular use to which the arrangement of FIG. 1 is applied in one or more of the various optical devices illustrated in FIGS. 3–6 to be described in detail hereinafter.

For some applications a constant angle of rotation may be desired and it may then be convenient to use a permanent magnet to supply the magnetic flux. Also when relatively slow changes in magnetic flux are desirable, variable magnetic shunts may be associated with the permanent magnet for producing such variations.

As illustrated by arrow $H_z$ the direction of the magnetic field produced by coil 18 is aligned substantially parallel to line z—z through rod 12. Linearly or elliptically polarized radiation depicted by arrow 20 (FIG. 2) which is directed along line z—z onto face 14 propagates through rod 12 toward face 16 and is rotated by Faraday effect through an angle $\theta$ whose magnitude is determined by the Verdet constant, the strength of the applied magnetic field and the length of rod 12 (distance between faces 14 and 16). Angle $\theta$ is positive in the direction of the currents through coil 18 that generate field $H_z$. When the direction of field $H_z$ is antiparallel or running in a contrary direction to the direction of propagation of radiation through rod 12, rotation will be opposite in sense but equal in magnitude from that produced by the illustrated parallel field provided the field is of the same intensity.

Angle $\theta$ is given by the formula $\theta = V H_z l$ where V is the Verdet constant of the material of rod 10, $H_z$ is the applied magnetic field in oersteds and $l$ is the length of rod 12 (distance between faces 12 and 14).

In producing Faraday rotation of linearly or elliptically polarized radiation in the glass of rod 12, the polarized radiation is broken up by the Zeeman effect into two counter rotating right and left circular waves or components that propagate faster or slower according to the indices of refraction N given by the following equations. Lower indices of refraction N for a particular right or left circular component will produce faster propagation thereof:

$$Nr = n + A(\lambda) H_z \qquad (1)$$

$$Nl = n - A(\lambda) H_z \qquad (2)$$

$Nr$ is the index of refraction for the right circular component, $Nl$ is the index of refraction for the left circular component, $n$ is the index of refraction of the glass of rod 12 in the absence of a magnetic field, $A(\lambda)$ is a factor that depends upon wavelength in vacuum, of the radiation incident upon the glass, and $H_z$ is the axial magnetic field in oersteds. The parameter $A(\lambda)$ is related to V (Verdet constant of the glass) by the relation $$A(\lambda) = \frac{\lambda V(\lambda)}{2\pi}$$

Equations 1 and 2 illustrate how the indices of refraction of the two circular waves or components inside the glass of rod 12 can be controlled by the magnetic field $H_z$ to speed up or slow down propagation thereof. An increase in intensity of $H_z$ for left circularly polarized radiation speeds up propagation thereof while the same increase in $H_z$ slows down propagation of right circularly polarized radiation.

By directing radiation into the glass which is circularly polarized in one direction only, its rate of propagation can be speeded up or slowed down by changing the intensity of magnetic field $H_z$. In this manner, the Faraday effect can be employed as a phase shifter as illustrated in FIG. 3.

In FIG. 3, radiation 22 which has been circularly polarized in one direction by polarizing element 24 is directed into rod 12 of rotator 10 through face 14. The index of refraction for the components of incident circularly polarized radiation 22 is then controlled by the intensity of magnetic field $H_z$ applied to coil 18 according to Equation 1 or 2 given hereinabove. In this way, the phase of transmitted radiation 22′ can be changed by changing the intensity of magnetic field $H_z$. That is, propagation of radiation 22 through rod 12 can be speeded up or slowed down according to a change of intensity of $H_z$. For left circularly polarized radiation 22, as shown in FIG. 3, an increase in intensity of $H_z$ speeds up propagation of the radiation.

If the radiation which is to be phase modulated by the arrangement of FIG. 3 is unpolarized, it can be circularly polarized by employing, as element 24, the combination of a linear polarizer 24′ and quarter wave retardation plate 24″ of mica or quartz. If, however, the radiation which is to be phase modulated is already plane or elliptically polarized, it can be circularly polarized by employing as element 24, only the mica or quartz retardation plate 24″. The necessary retardation and orientation of this plate is dictated by the polarization of the incident radiation.

Also, the transmitted circularly polarized phase modulated radiation 22′ can, if desired, be converted to any desirable state of polarization, linearly or elliptically, by directing same through an element 26 comprising a retardation plate or combination linear polarizer and retardation plate similar to that just discussed with relation to element 24. Radiation having passed through element 26 however converted as to form would, of course, be modulated according to the changes in intensity of magnetic field $H_z$ just as the radiation 22′ itself is so modulated.

In FIG. 4, Faraday rotation of elliptically polarized radiation 28 by rotator 10 is illustrated. Radiation 28 is, for purposes of illustration, shown as being incident upon face 14 of rod 12 with the major axis of the ellipse or longest vibrations of radiation 28 running parallel to vertical meridian y—y and orthogonal to horizontal meridian x—x. By the Faraday effect discussed with relation to FIG. 1, radiation 28 is rotated during propagation through rod 12 in the presence of magnetic field $H_z$ in a direction positive with relation to the direction of current in coil 18 and by the amount of angle $\theta$ in accordance with the formula $\theta = VH_z l$. With the magnetic field $H_z$ antiparallel to the direction of propagation of radiation through rod 12, rotation of radiation 28' would be opposite in sense but equal in magnitude to that illustrated in FIG. 4.

With rotator 10 driven by a sinusoidal magnetic field, the arrangement of FIG. 4 would, as one example, have considerable utility as a Faraday modulation cell in a high accuracy photoelectric polarimeter such as that disclosed in U.S. Patent No. 2,974,561.

In FIG. 5 the arrangement of a Faraday isolator utilizing rotator 10 is illustrated. In this device, the magnetic field is unidirectional as illustrated by arrow $H_z$. Radiation 30 caused to be incident upon face 14 of rod 12 from the left as viewed in FIG. 5 is plane polarized by polarizer 32 which has, for purposes of illustration, its transmission axis 34 disposed parallel to meridian y—y. During propagation through rod 12, the plane polarized radiation 30 is rotated as illustrated by arrow 30' through angle $\theta$ which as described above can be controlled by the intensity of magnetic field $H_z$ and thickness 1 (distance between faces 14 and 16) of rod 12 to be, for example, 45° with respect to transmission axis 34 of polarizer 32. The rotated radiation 30' then passes through second polarizer 36 having its transmission axis 38 disposed at the corresponding 45° angle. Arrow 30" illustrates radiation passed through polarizer 36.

Radiation originating from the right of polarizer 36 as viewed in FIG. 5 is plane polarized to the 45° angle of polarizer 36 as illustrated by arrow 40. In passing through rod 12, this radiation is rotated another 45° as indicated by arrow 42 so that it is now disposed in a direction orthogonal to the plane of transmission axis 34 of polarizer 32. Thus, radiation 42 cannot pass through polarizer 32. It can be seen from the above that, as a Faraday isolator, the arrangement of FIG. 5 will pass radiation from left to right but will block radiation tending to travel therethrough from right to left.

In FIG. 6, there is shown the arrangement of a Faraday shutter utilizing rotator 10. Adjacent the opposite faces 14 and 16 of rod 12, polarizers 44 and 46 respectively are placed on line z—z. Transmission axes 48 and 50 respectively of polarizers 44 and 46 are fixedly positioned in right angular relation to each other and both intersecting line z—z as illustrated.

In the absence of magnetic field $H_z$ radiation cannot pass through the arrangement in FIG. 6 from either direction, right or left, along line z—z since under such condition no appreciable Faraday rotation will take place in rod 12 and one polarizer acts as an occluder to light passed through the other. However, by the application of a short pulse of electrical current to coil 18 of sufficient magnitude at its peak to produce a Faraday rotation of 90° in rod 12, plane polarized radiation passing through one polarizer 44 or 46 is rotated by rotator 10 to the 90° orientation of the transmission axis of the other polarizer. The other polarizer will then pass the light without hindrance. Thus, the shutter action of the arrangement illustrated in FIG. 6 can be controlled according to the frequency and duration of pulses of electrical current applied to coil 18. In practice, a Faraday rotation of less than 90° in rotator 10 can be used to provide suitable shutter action when the transmission axes of polarizers 44 and 46 are oriented to an angular difference approximately equal to 90°.

In any or all of the above-described applications of rotator 10 the transmissions of the glass can be improved by applying a suitable anti-reflection or reflection reduction coating to one or both of the surfaces 14 and 16 thereof. Reference may be made to assignee's Patent No. 2,466,119 issued to H. Moulton et al. for examples of such coatings.

As an alternative to the use of anti-reflection coatings but only in instances where plane polarized radiation is incident on the surface 14 or 16, the surfaces may be cut or ground and polished so that the incoming radiation has an angle of incidence with the particular surface whose tangent is equal to the index of refraction of the glass of rod 10 so that radiation which is plane polarized in the plane of incidence is not reflected from the surface.

As mentioned hereinabove, the direction of Faraday rotation in rotator 10 depends only upon the direction of the magnetic field $H_z$ and not upon the direction of propagation of radiation therethrough. In view of this, the present invention contemplates the use of a rotator 10' such as is illustrated in FIG. 7 wherein multiple internal reflections of radiation 52 passing therethrough extend the path length through rotator 10'. This provides for greater degrees of rotation with smaller rotating elements and magnetic fields.

In the embodiment illustrated in FIG. 7, radiation receiving and emitting faces 54 and 56 respectively are provided adjacent opposite ends of bar 58 formed of an arsenic-sulphur group glass such as arsenic trisulfide. The sides of bar 58 opposite to faces 54 and 56 are coated with a highly reflecting metallic material or a glass of lower index of refraction than that of bar 58 so as to provide interfaces 60 and 62 which are highly internally reflective to radiation 52.

With magnetic field $H_z$ directed as indicated in FIG. 7, radiation will be rotated upon emerging from face 56 through an angle $\theta$ equal to $VH_z l$ where, in this case, $l$ is determined by the length of the path created by the multiple reflections produced in bar 58.

I claim:
1. The new use for glass consisting essentially of arsenic and an element of the sulphur group comprising the steps of:
   placing the glass in a magnetic field; and
   directing polarized electromagnetic radiation into the glass for effecting Faraday rotation of the radiation.
2. The invention according to claim 1 wherein the glass is arsenic trisulfide.
3. The invention according to claim 1 wherein the electromagnetic radiation is plane polarized.
4. The invention according to claim 1 wherein the electromagnetic radiation is circularly polarized.
5. The invention according to claim 1 wherein the electromagnetic radiation is elliptically polarized.
6. The invention according to claim 1 wherein the magnetic field is varied in intensity according to phase variations desired to be effected in said radiation during propagation through said glass.
7. The invention according to claim 1 wherein said magnetic field is selectively intermittently deactivated for shuttering of said radiation.
8. The invention according to claim 1 wherein said radiation is propagated through said glass by total internal reflection.

References Cited

UNITED STATES PATENTS

| | | | |
|---|---|---|---|
| 2,987,959 | 6/1961 | Kimmel | 350—151 |
| 3,033,693 | 5/1962 | Carnall et al. | |
| 3,245,314 | 4/1966 | Dillon | 350—151 |

DAVID SCHONBERG, *Primary Examiner.*

P. R. MILLER, *Assistant Examiner.*